(12) United States Patent
Chen et al.

(10) Patent No.: US 11,504,846 B2
(45) Date of Patent: Nov. 22, 2022

(54) ROBOT TEACHING SYSTEM BASED ON IMAGE SEGMENTATION AND SURFACE ELECTROMYOGRAPHY AND ROBOT TEACHING METHOD THEREOF

(71) Applicant: QINGDAO UNIVERSITY OF TECHNOLOGY, Qingdao (CN)

(72) Inventors: Chengjun Chen, Qingdao (CN); Yong Pan, Qingdao (CN); Dongnian Li, Qingdao (CN); Zhengxu Zhao, Qingdao (CN); Jun Hong, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 186 days.

(21) Appl. No.: 17/153,202

(22) Filed: Jan. 20, 2021

(65) Prior Publication Data
US 2022/0161422 A1  May 26, 2022

(30) Foreign Application Priority Data
Nov. 26, 2020  (CN) .......................... 202011348771.1

(51) Int. Cl.
*B25J 9/22*  (2006.01)
*B25J 9/16*  (2006.01)
(Continued)

(52) U.S. Cl.
CPC .................. *B25J 9/163* (2013.01); *G06T 7/11* (2017.01); *G06T 7/70* (2017.01); *G06T 19/006* (2013.01);
(Continued)

(58) Field of Classification Search
CPC .... B25J 9/163; G06T 7/11; G06T 7/70; G06T 19/006; G06T 2207/10016;
(Continued)

(56) References Cited

U.S. PATENT DOCUMENTS

2020/0069211 A1\*  3/2020  Berenzweig ........... A61B 5/316
2021/0122045 A1\*  4/2021  Handa ....................... G06T 7/74

FOREIGN PATENT DOCUMENTS

CN           108127669 A  *  8/2018  ............... B25J 9/22

\* cited by examiner

*Primary Examiner* — Jin Ge
(74) *Attorney, Agent, or Firm* — McClure, Qualey & Rodack, LLP

(57) ABSTRACT

The present invention relates to a robot teaching system based on image segmentation and surface electromyography and robot teaching method thereof, comprising a RGB-D camera, a surface electromyography sensor, a robot and a computer, wherein the RGB-D camera collects video information of robot teaching scenes and sends to the computer; the surface electromyography sensor acquires surface electromyography signals and inertial acceleration signals of the robot teacher, and sends to the computer; the computer recognizes a articulated arm and a human joint, detects a contact position between the articulated arm and the human joint, and further calculates strength and direction of forces rendered from a human contact position after the human joint contacts the articulated arm, and sends a signal controlling the contacted articulated arm to move along with such a strength and direction of forces and robot teaching is done.

10 Claims, 4 Drawing Sheets

(51) Int. Cl.
*G06T 7/11* (2017.01)
*G06T 7/70* (2017.01)
*G06V 40/10* (2022.01)
*G06T 19/00* (2011.01)

(52) U.S. Cl.
CPC .... *G06V 40/10* (2022.01); *G06T 2207/10016* (2013.01); *G06T 2207/10024* (2013.01); *G06T 2207/10028* (2013.01); *G06T 2207/20081* (2013.01); *G06T 2207/20084* (2013.01); *G06T 2207/30196* (2013.01)

(58) Field of Classification Search
CPC . G06T 2207/10024; G06T 2207/10028; G06T 2207/20081; G06T 2207/20084; G06T 2207/30196; G06V 40/10
USPC .......................................................... 700/253
See application file for complete search history.

US 11,504,846 B2

ROBOT TEACHING SYSTEM BASED ON IMAGE SEGMENTATION AND SURFACE ELECTROMYOGRAPHY AND ROBOT TEACHING METHOD THEREOF

TECHNICAL FIELD

The present invention relates to a robot teaching system based on image segmentation and surface electromyography and robot teaching method thereof, which belongs to robotics and intelligent manufacturing field.

BACKGROUND TECHNOLOGY

Teaching pendants and robot hand guiding are commonly used in traditional industrial robot teaching system. Among that, a robot that is hand guided is configured with a 6 D force torque sensor, in this way, it is possible for the robot to retrieve travelling information and also interactive force information during hand guiding. Although it is quite easy to conduct robot teaching by hand guiding, force control and response based on end-point force detection is slow, and the 6 D force torque sensor is very expensive, which renders cost for hand guiding very high. There is another solution available: to embed a force torque sensor and a double encoder in the reducer output end to form a flexible joint and a linear elastic actuator. Although it is convenient to make kinematic position control and realize force control, but to add a force torque sensor in a joint will increase complexity of the joint structure and lower rigidity of joint driving chains.

SUMMARY OF THE INVENTION

To address the above mentioned technical problem, the present invention provides a robot teaching system based on image segmentation and surface electromyography, to make image segmentation with a deep learning network, segment and recognize articulated arms and human joints, judge contact condition between the human joints and the articulated arms, judge strength and direction of force from the human by the surface electromyography sensor and control each of the articulated arms to move and realize robot teaching.

A First Technical Solution of the Present Invention

A robot teaching system based on image segmentation and surface electromyography, comprising a RGB-D camera, a surface electromyography sensor, a robot and a computer, all of the RGB-D camera, the surface electromyography sensor and the robot are in communication with the computer, the RGB-D camera collects video information of robot teaching scenes and sends to the computer; the surface electromyography sensor is worn on a forearm of a robot teacher, the surface electromyography sensor acquires surface electromyography signals and inertial acceleration signals of the robot teacher, and sends to the computer; the computer recognizes a articulated arm and a human joint, detects a contact position between the articulated arm and the human joint, calculates strength and direction of forces rendered from a human contact position after the human joint contacts the articulated arm by the surface EMG signals and inertial acceleration signals, and sends a signal controlling the contacted articulated arm to move along with such a strength and direction of forces and robot teaching is done.

Preferably, a articulated arm segmentation module, a human joint segmentation module and a distance measurement module are run in the computer; the articulated arm segmentation module conducts image segmentation to the video information by means of trained image segmentation network using deep learning, recognizes different species of articulated arms and marks the different species of articulated arms with different colors in the video information; the human arm segmentation module recognizes human bone joints in the video information, segments and marks the human bone joints and calculates coordinate information of the human bone joints; the distance measurement module measures distance between different human bone joints to different articulated arms, and judges whether the human bone joints contact the articulated arms, if so, judges which articulated arm the human bone joints contact, and based on current running mode, sends a signal corresponding to the current running mode, the running modes comprise a teaching mode and a working mode, during the teaching mode, when a human hand joint contacts the articulated arms, sends a signal detection signal, and if not, sends a warning signal; during a working mode, when a human arm contacts the articulated arms, sends a collision and warning signal.

Preferably, a surface electromyography signal detection module and a robot communication and control module are run in the computer; the surface electromyography signal detection module judges strength and direction of a force from the human arm after the human arm contacts the articulated arm according to received surface electromyography signals and inertial acceleration signals and sends the strength and direction of the force and species of the articulated arm contacted by the human arm to the robot communication and control module; the robot communication and control module receives information from the surface electromyography signal detection module, sends a signal controlling the contacted articulated arm to move against a robot base according to species of the articulated arm contacted by the human arm, controls movement direction of the contacted articulated arm according direction of the force, controls movement speed of the contacted articulated arm according to strength of the force, in the meantime, the robot communication and control module saves robot movement parameters; when receiving a collision signal, the robot communication and control module controls the robot to stop immediately and restart after collision signal is dismissed. Preferably, the distance measurement module operates the following steps: S31: converting RGB-D images of the articulated arms segmented by the articulated arm segmentation module and the human arm segmented by the human arm segmentation module into point cloud; S32: marking position in point cloud of different articulated arms, marking position in 3D point cloud of different human joints and generating point cloud tags; S33: conducting a collision check between point cloud of each of the articulated arms and point cloud of each of the human joints, when a collision is detected between point cloud of different positions, go to step 34; S34: in a teaching mode, checking a point cloud tag of the human joint that collides with the articulated arm, and judging a contact position between the articulated arm and the human joint, in case a human hand collides with the articulated arm, sending a signal detection instruction to the surface electromyography detection module; otherwise, sending a warning signal; during working mode, sending a warning signal and sending a collision signal to the robot communication and control module to control the robot to stop running.

Preferably, an augmented reality verification module is run in the computer, wherein the augmented reality verification module comprises a virtual robot model, an augmented reality display module, and an AR card, which comprises the following steps: S61: setting up the virtual robot model with robot parameters, establishing degree of freedom nodes for the virtual robot and setting up parent/child relationship, and building a virtual robot kinematic model; S62: controlling the robot to move, putting an end effector of the robot sequentially in four corners of the AR card, and when the end effector arrives at a corner of the AR card, reading coordinates of the end effector by the robot, and getting coordinates of the AR card corner in a robot coordinate system, and as coordinates of four corners of the AR card in the AR card coordinate system are known, it is possible to reach a conversion relationship between the AR card coordinate system and the robot coordinate system, describing position of the virtual robot in the AR card coordinate system and converting to the robot coordinate system by the conversion relationship and superposing the virtual robot model to the robot; S63: after robot teaching completion, superposing the virtual robot model to a working scene of the robot, reading motion parameters recorded by the robot communication and control module with the augmented reality display module, and moving the virtual robot model along a robot teaching route, to verify the robot teaching route in a virtual and reality mixing environment.

The present further provides a robot teaching method based on image segmentation and surface electromyography.

A Second Technical Solution of the Present Invention is as Following

A robot teaching method based on image segmentation and surface electromyography, the method takes advantage of a RGB-D camera, a surface electromyography sensor, a robot and a computer; the surface electromyography sensor is worn on a forearm of a robot teacher, and executes following steps: the RGB-D camera collects video information of robot teaching scenes and sends to the computer, the surface electromyography sensor collects human surface electromyography signals and inertial acceleration signals and sends to the computer, the computer runs following steps: S1: recognizing articulated arms from the video information; S2: recognizing a human arm from the video information; S3: detecting a contact position between the human arm and the articulated arms; S4: calculating strength and direction of force from the human arm after the human arm contacts the articulated arms with surface electromyography signals and inertial acceleration signal; S5: sending a signal by the computer controlling the contacted articulated arm to move as per the strength and direction of force and realizing robot teaching.

Preferably, step S1 to step S3 comprise: S1: conducting image segmentation to the video information by means of trained image segmentation network using deep learning, recognizing different species of articulated arms and marking the different species of articulated arms with different colors in the video information; S2: recognizing human bone joints in the video information, segmenting and marking the human bone joints and calculating coordinate information of the human bone joints; S3: measuring distance between different human bone joints to different articulated arms, and judging whether the human bone joints contact the articulated arms, if so, judging which articulated arm the human bone joints contact, and based on current running mode, sending a signal corresponding to the current running mode, the running modes comprise a teaching mode and a working mode, during the teaching mode, when a human hand joint contacts the articulated arms, sending a signal detection signal, and if not, sending a warning signal; during a working mode, when a human arm contacts the articulated arms, sending a collision and warning signal.

Preferably, step S4 and step S5 comprise: S4: upon receiving a signal detection instruction by the computer, the computer judges strength and direction of a force from the human arm after the human arm contacts the articulated arm according to received surface electromyography signals and inertial acceleration signals and sends the strength and direction of the force and species of the articulated arm contacted by the human arm to the robot communication and control module; S5: The robot communication and control module receives information from the surface electromyography signal detection module, sends a signal controlling the contacted articulated arm to move against a robot base according to species of the articulated arm contacted by the human arm, controls movement direction of the contacted articulated arm according direction of the force, controls movement speed of the contacted articulated arm according to strength of the force, in the meantime, the robot communication and control module saves robot movement parameters; when receiving a collision signal, the robot communication and control module controls the robot to stop immediately and restart after collision signal is dismissed.

Preferably, step S3 comprises: S31: converting RGB-D images of the articulated arms segmented by the articulated arm segmentation module and the human arm segmented by the human arm segmentation module into point cloud; S32: marking position in point cloud of different articulated arms, marking position in 3D point cloud of different human joints and generating point cloud tags; S33: conducting a collision check between point cloud of each of the articulated arms and point cloud of each of the human joints, when a collision is detected between point cloud of different positions, go to step 34; S34: in a teaching mode, checking a point cloud tag of the human joint that collides with the articulated arm, and judging a contact position between the articulated arm and the human joint, in case a human hand collides with the articulated arm, sending a signal detection instruction to the surface electromyography detection module; otherwise, sending a warning signal; during working mode, sending a warning signal and sending a collision signal to the robot communication and control module to control the robot to stop running.

Preferably, step S6 specifically comprises: S61: setting up a virtual robot model with robot parameters, establishing degree of freedom nodes for the virtual robot and setting up parent/child relationship, and building a virtual robot kinematic model; S62: controlling the robot to move, putting an end effector of the robot sequentially in four corners of the AR card, and when the end effector arrives at a corner of the AR card, reading coordinates of the end effector by the robot, and getting coordinates of the AR card corner in a robot coordinate system, and as coordinates of four corners of the AR card in the AR card coordinate system are known, it is possible to reach a conversion relationship between the AR card coordinate system and the robot coordinate system, describing position of the virtual robot in the AR card coordinate system and converting to the robot coordinate system by the conversion relationship and superposing the virtual robot model to the robot; S63: after robot teaching completion, superposing the virtual robot model to a working scene of the robot, reading motion parameters recorded by the robot communication and control module with the augmented reality display module, and moving the virtual robot model along a robot teaching route, to verify the robot teaching route in a virtual and reality mixing environment.

The Present Invention has the Following Advantageous Effects

The robot teaching system based on image segmentation and surface electromyography provided by the present invention, makes image segmentation with a deep learning network, segments and recognizes articulated arms and human joints, judges contact condition between the human joints and the articulated arms, judges strength and direction of force from the human by the surface electromyography sensor and controls each of the articulated arms to move and realize robot teaching. The robot teaching system according to the present invention is of simple structure, easy to deploy and not costly. In the meantime, the teaching method provided by the present invention is easy to operate, of which force control and response is quick, and it is possible to control the robot to follow teaching gestures accurately.

EMBODIMENTS

In the following part, a detailed description will be given to the present invention based on the accompanying drawings and the embodiments.

Figure 1:
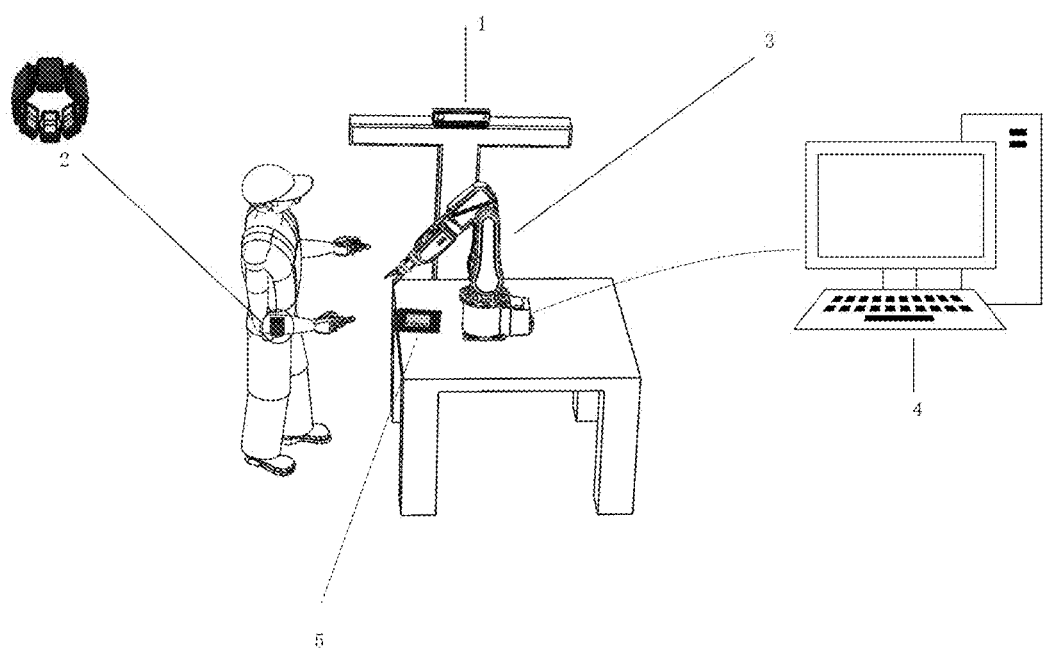
FIG. 1 is a structural diagram of a robot teaching system according to the present invention.
Figure 2:
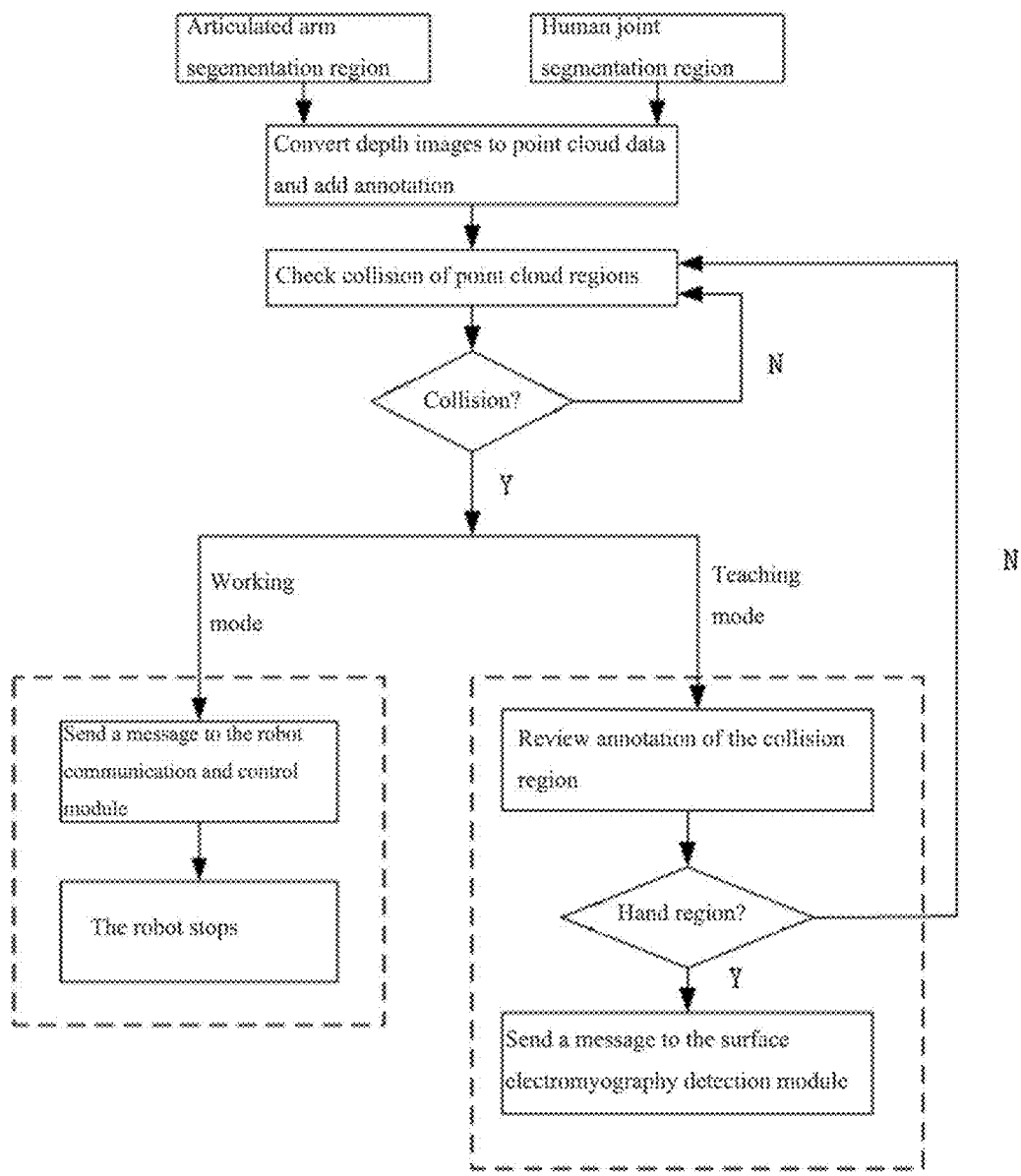
FIG. 2 is a flowchart of a robot teaching process according to the present invention.

Please refer to FIG. 1 and FIG. 2, a robot teaching system based on image segmentation and surface electromyography, comprising a RGB-D camera 1, a surface electromyography sensor (such as a Myo armband) 2, a robot 3 and a computer 4, all of the RGB-D camera 1, the surface electromyography sensor 2 and the robot 3 are in communication with the computer 4, the RGB-D camera 1 collects video information of robot teaching scenes and sends to the computer 4 and the computer 4 retrieves colored images and deep images of the robot teaching scenes. The surface electromyography sensor 2 is worn on a forearm of a robot teacher, the surface electromyography sensor 2 acquires surface electromyography signals and inertial acceleration signals of the robot teacher, and sends to the computer 4; the computer 4 recognizes articulated arms and human joints, detects a contact position between the articulated arms and the human joints, calculates strength and direction of forces rendered from a human contact position after the human joint contacts the articulated arm by the surface EMG signals and inertial acceleration signals, and sends a signal controlling the contacted articulated arm to move along with such a strength and direction of forces and robot teaching is done. It shall be noted that, in the present embodiment, the robot, which is an industrial robot, comprises a robot base, a mechanical arm connected with the robot base and an end effector connected with the mechanical arm. The mechanical arm comprises a plurality of articulated arm. The end effector is a tool of certain functions connected to the mechanical arm, to work as a welding gun, a clamping jaw and a clamping jaw as shown in FIG. 1.

Please see FIG. 2, an articulated arm segmentation module 4-1, a human joint segmentation module 4-2, a distance measurement module 4-3, a surface electromyography signal detection module 4-4 and a robot communication and control module 4-5 are run in the computer 4.

The articulated arm segmentation module 4-1 conducts image segmentation to the video information by means of trained image segmentation network using deep learning such as FCNN, U-Net, DeepLab and Mask R-CNN, segments articulated arms of the robot in a real time basis, and detects types of the articulated arms, wherein the types of the articulated arms include attributes such as which articulated arm it is and robot joint rotation coordinate axes. Subsequently, mark different articulated arms with different colors in the video information. Specifically, the articulated arm segmentation module 4-1 comprises three steps, namely, training dataset integration, deep leaning network model training and deep learning network real-time segmentation, specifically as following: First of all, establish a robot model training dataset. The training dataset comprises a virtual robot model training dataset and a real robot training dataset. The virtual robot model training dataset comprises a set of robot depth images and a set of image tags corresponding to the depth images with the robot 3 in a variety of monitoring perspectives and different poses based on modeling and image rendering in the computer 4. Modeling of the computer 4 is to set up a 3D virtual robot model with 3D drawing software such as solidworks. The set of image tags means to render different articulated arms of a robot model in different colors. The monitoring perspective is an angle between the depth camera and the robot 3 to be monitored, and when the robot model moves within a preset range, there are a variety of monitoring perspectives. The real robot training dataset is to take depth images of the robot 3 with the RGB-D camera 1, conduct an image denoising, label different articulated arms with different colors in the denoised robot depth images with annotation software such as labelme, and get the real robot depth image dataset and the image tag dataset.

Secondly, conduct robot articulated arm segmentation model training: sending the virtual training dataset and the real training dataset to an image segmentation using deep learning network model, such as FCNN, U-Net, DeepLab and Mask R-CNN for training; the image segmentation using deep learning network model will learn appearance and profile of the articulated arms as labeled according to pixel information marked in the image tag dataset and get deep learning network training configurations.

Finally, a real-time inspection: record images at the working scenes of the robot 3 by installing a RGB-D camera in the robot 3 working site, and send images to the trained image segmentation model to make robot articulated arm segmentation, recognize different articulated arms of the robot 3 and label with different colors in the images of the working scenes.

The human arm segmentation module 4-2 recognizes human bone joints in the video information, such as by using images taken by a Kinect camera or other RGB-D camera 1, recognizes human joints and related parts (such as a joint at hand or head) by differentiate feature extraction—random forest algorithms and deep learning, segments and marks the human bone joints and calculates coordinate information of the human bone joints.

The distance measurement module 4-3 measures distance between different human bone joints to different articulated arms, and judges whether the human bone joints contact the articulated arms, if so, judges which articulated arm of the robot 3 the human bone joints contact, and based on current running mode, sends a signal corresponding to the current running mode, the running modes comprise a teaching mode and a working mode, during the teaching mode, when a human hand joint contacts the articulated arms, sends a signal detection signal, and if not, sends a warning signal; during a working mode, when a human arm contacts the articulated arms, sends a collision and warning signal.

Figure 3:
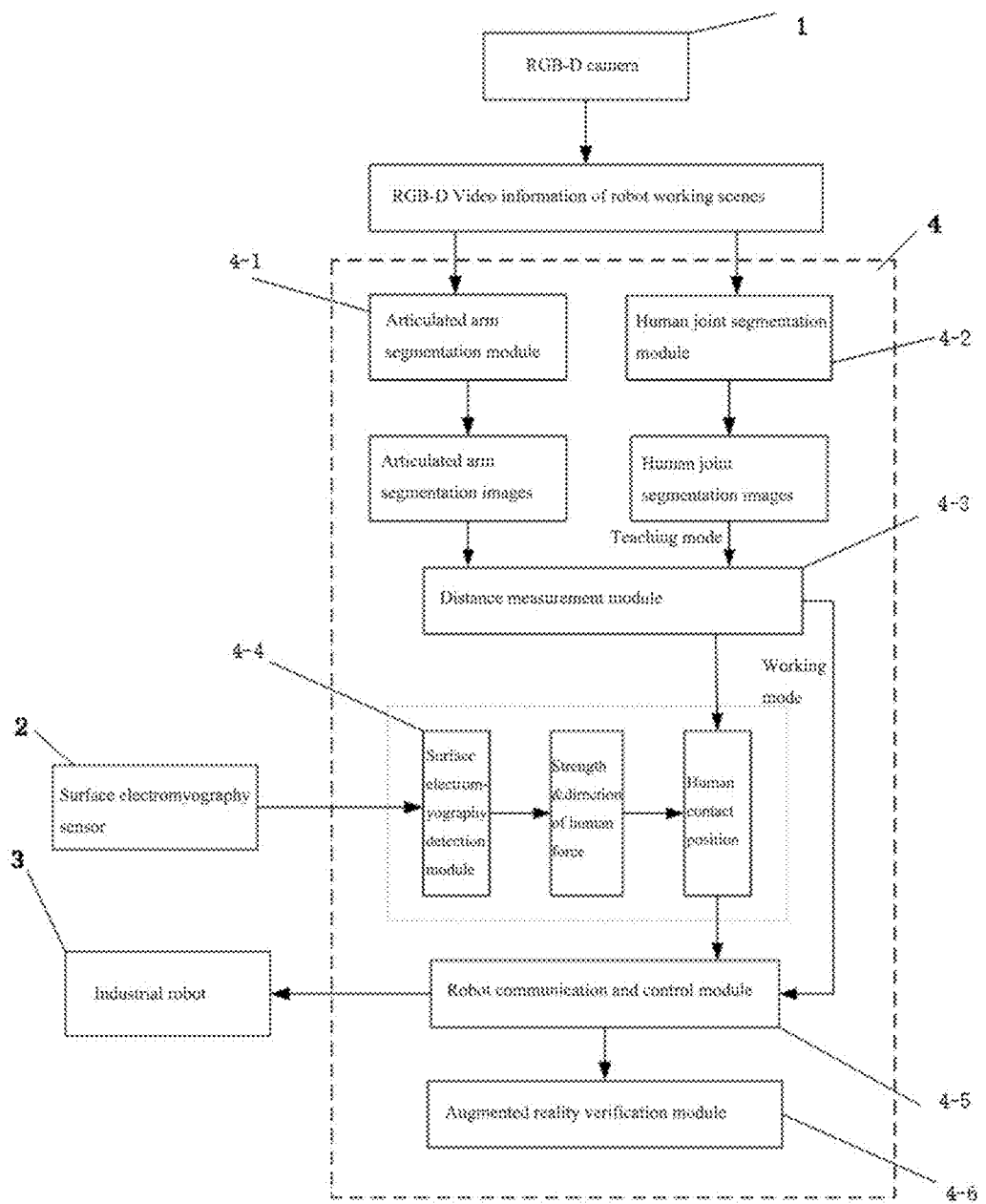
FIG. 3 is a flowchart of a collision detection module according to the present invention.

Please refer to FIG. 3, in the present embodiment, the distance measurement module 4-3 converts information of all the positions and joints segmented by the robot articulated arm segmentation module 4-1 and the human arm segmentation module 4-2 to point cloud data with different position tags and conducts a collision check, sends different instructions to the surface electromyography signal detection module 4-4 or the robot communication and control module 4-5 based on different robot working modes. The distance measurement module 4-3 operates the following steps: S31: converting RGB-D images of the articulated arms segmented by the articulated arm segmentation module 4-1 and the human arm segmented by the human arm segmentation module 4-2 into point cloud; S32: marking position in point cloud of different articulated arms, marking position in 3D point cloud of different human joints and generating point cloud tags; S33: conducting a collision check between point cloud of each of the articulated arms and point cloud of each of the human joints, when a collision is detected between point cloud of different positions, go to step 34; S34: in a teaching mode, checking a point cloud tag of the human joint that collides with the articulated arm, and judging a contact position between the articulated arm and the human joint, in case a human hand collides with the articulated arm, sending a signal detection instruction to the surface electromyography detection module 4-4; otherwise, sending a warning signal; during working mode, sending a warning signal and sending a collision signal to the robot communication and control module 4-5 to control the robot 3 to stop running.

The surface electromyography signal detection module 4-4 judges strength and direction of a force from the human arm after the human arm contacts the articulated arm according to received surface electromyography signals and inertial acceleration signals and sends the strength and direction of the force and species of the articulated arm contacted by the human arm to the robot communication and control module 4-5.

Figure 4:
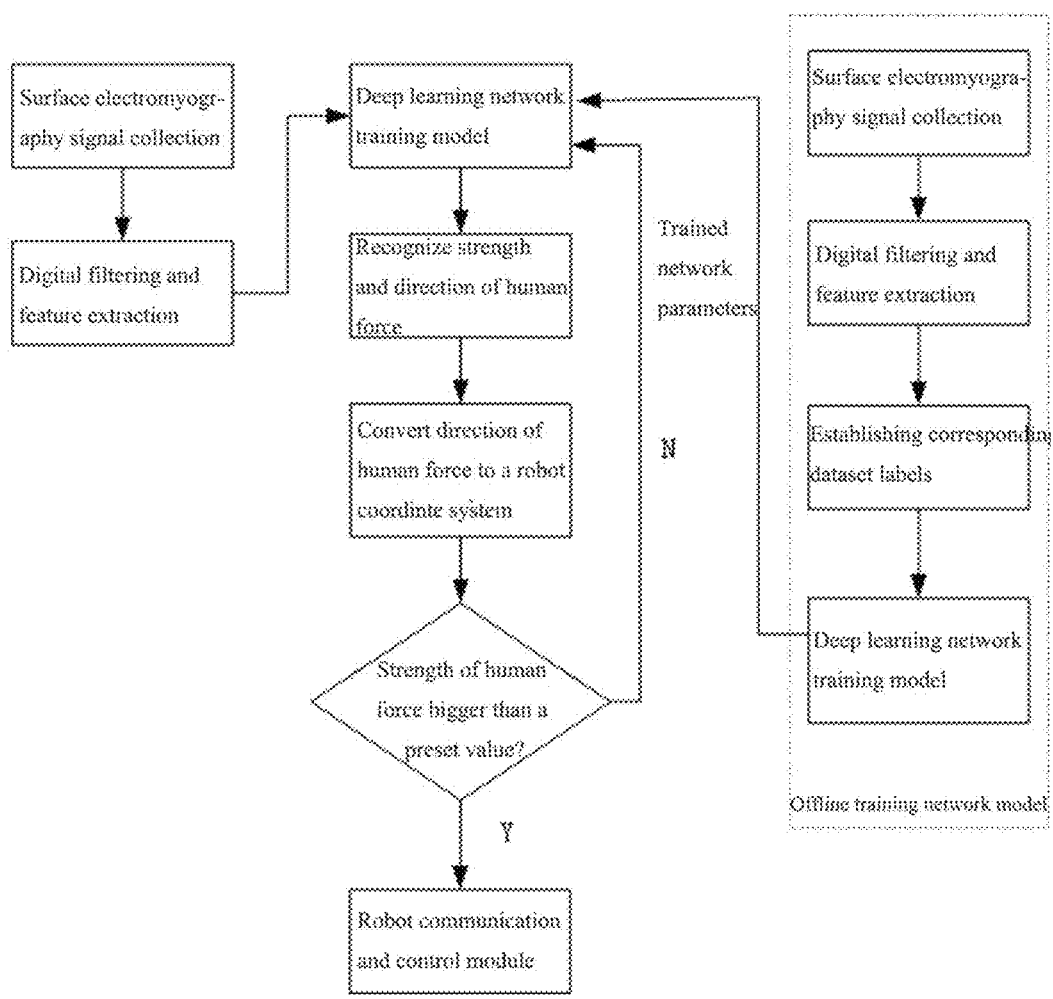
FIG. 4 is a flowchart of a surface electromyography detection module according to the present invention.

Please see FIG. 4, the surface electromyography signal detection module 4-4 collects human surface electromyography signals, and inertial acceleration signals, inputs the human surface electromyography signals and inertial acceleration signals into a neural learning network for training after feature extraction processing, and recognizes and analyzes surface electromyography signals with the trained neural network to identify magnitude and direction of the force. Specifically there are the following steps: Step 41: collect human surface electromyography signals and inertial acceleration signals and conduct a pretreatment, such as a Fourier transformation to transform collected time domain signals into frequency domain signals and performing a digital filter processing and extracting features. Step 42. Establish a human surface electromyography signal dataset and an inertial acceleration signal dataset. Collect surface electromyography signals and inertial acceleration signals of human motions according to force rendered when a teacher pushes an articulated arms of the robot and conduct a pretreatment to the signals as per step 41, establish datasets according to extracted features and mark corresponding labels and in the present invention, label human force rendering direction data in a human coordinate system. Step 43, send the established datasets to a deep learning network model for training, such as deep learning solutions CNN, RNN, Transfer learning. Step 44, identify magnitude and direction of forces on a real-time basis. Recognize magnitude and direction of forces from human surface electromyography signals with the trained deep learning model and data processed in step 41, and convert force direction from the human coordinate system to the robot coordinate system. Step 45, judge whether the force magnitude reaches the minimum threshold value, and determine whether the human arm contacts the articulated arms of the robot from whether the force magnitude reaches the threshold value, and send the magnitude, direction of the force and a type of the articulated arms of the robot to the robot communication and control module 4-5. The robot communication and control module 4-5 receives information from the surface electromyography signal detection module 4-4, sends a signal controlling the contacted articulated arm to move against a robot base according to species of the articulated arm contacted by the human arm, controls movement direction of the contacted articulated arm according direction of the force, controls movement speed of the contacted articulated arm according to strength of the force, in the meantime, the robot communication and control module 4-5 saves movement parameters of the robot 3; when receiving a collision signal, the robot communication and control module 4-5 controls the robot 3 to stop immediately and restart after collision signal is dismissed.

Working steps of the robot communication and control module 4-5 are: step 51, setting a running mode for the robot 3, in the present invention there are two kinds of running modes, namely a teaching mode and a working mode. Step 52, during the teaching mode, receive magnitude and direction of force and the kind of articulated arm of the robot 3 to be contacted by a human hand and control movement of the articulated arm according to the kind of articulated arm of the robot 3, control movement direction of the articulated arm according to the direction of forces and control movement speed of the articulated arm according to the magnitude of force. Step 53, during the working mode, the robot communication and control module 4-5 controls the robot 3 to stop immediately when receiving a collision signal from the detection measurement module 4-3, and resume after the collision signal is lifted. Step 54, store movement parameters during robot teaching process.

In the present embodiment, an augmented reality verification module 4-6 is run in the computer 4, wherein the augmented reality verification module 4-6 comprises a virtual robot model, an augmented reality display module, and an AR card 5, which comprises the following steps: S61: setting up the virtual robot model with robot parameters, to have the augmented reality verification module 4-6 to load and recognize the virtual robot model and control its motion, establishing degree of freedom nodes for the virtual robot and setting up parent/child relationship, and building a virtual robot kinematic model based on motion parameters from a motion designing module; wherein, degree of freedom nodes are a coordinate system in the virtual robot model based on real robot articulated arm joints, so that the augmented reality verification module 4-6 can read and control different nodes of the virtual robot. Parent/child relationship is a relationship that a movement of the parent node will bring movement of the child node, which conforms with kinematic modes of the robot 3. S62: controlling the robot 3 to move, putting an end effector of the robot 3 sequentially in four corners of the AR card 5, and when the end effector arrives at a corner of the AR card 5, reading coordinates of the end effector by the robot 3, and getting coordinates of the AR card 5 corner in a robot coordinate system, and as coordinates of four corners of the AR card 5 in the AR card coordinate system are known, it is possible to reach a conversion relationship between the AR card coordinate system and the robot coordinate system, describing position of the virtual robot in the AR card coordinate system and converting to the robot coordinate system by the conversion relationship and superposing the virtual robot model to the robot 3; S63: after robot teaching completion, superposing the virtual robot model to a working scene of the robot 3, reading motion parameters recorded by the robot communication and control module 4-5 with the augmented reality display module, and moving the virtual robot model along a robot teaching route, to verify the robot teaching route in a virtual and reality mixing environment.

The robot teaching system based on image segmentation and surface electromyography provided by the present invention, makes image segmentation with a deep learning network, segments and recognizes articulated arms and human joints, judges contact condition between the human joints and the articulated arms, judges strength and direction of force from the human by the surface electromyography sensor 2 and controls each of the articulated arms to move and realize robot teaching. The robot teaching system according to the present invention is of simple structure, easy to deploy and not costly. In the meantime, the teaching method provided by the present invention is easy to operate, of which force control and response is quick, and it is possible to control the robot 3 to follow teaching gestures accurately.

Embodiment 2

Please refer to FIG. 1 and FIG. 2, a robot teaching system based on image segmentation and surface electromyography, comprising a RGB-D camera 1, a surface electromyography sensor 2, a robot 3 and a computer 4, the surface electromyography sensor (such as a Myo armband) 2 is worn on a forearm of a robot teacher. The RGB-D camera 1 collects video information of robot teaching scenes and sends to the computer 4 and the computer 4 retrieves colored images and deep images of the robot teaching scenes. The surface electromyography sensor 2 acquires surface electromyography signals and inertial acceleration signals of the robot teacher, and sends to the computer 4; the computer 4 conducts the following steps: S1. Recognizing articulated arms and human joints; S2. Detecting a contact position between the articulated arms and the human joints; S3. calculating strength and direction of forces rendered from a human contact position after the human joint contacts the articulated arm by the surface EMG signals and inertial acceleration signals; S4. sending a signal controlling the contacted articulated arm to move along with such a strength and direction of forces and realizes robot teaching.

It shall be noted that, in the present embodiment, the robot, which is an industrial robot, comprises a robot base, a mechanical arm connected with the robot base and an end effector connected with the mechanical arm. The mechanical arm comprises a plurality of articulated arm. The end effector is a tool of certain functions connected to the mechanical arm, to work as a welding gun, a clamping jaw and a clamping jaw as shown in FIG. 1.

Please see FIG. 2, the steps S1-S3 specifically comprises: S1: conducting image segmentation to the video information by means of trained image segmentation network using deep learning such as FCNN, U-Net, DeepLab and Mask R-CNN, segmenting articulated arms of the robot in a real time basis, and detecting types of the articulated arms, wherein the types of the articulated arms include attributes such as which articulated arm it is and robot joint rotation coordinate axes. Subsequently, mark different articulated arms with different colors in the video information. Furthermore, deep leaning network model training comprises the following steps: First of all, establishing a robot model training dataset. The training dataset comprises a virtual robot model training dataset and a real robot training dataset. The virtual robot model training dataset comprises a set of robot depth images and a set of image tags corresponding to the depth images with the robot 3 in a variety of monitoring perspectives and different poses based on modeling and image rendering in the computer 4. Modeling of the computer 4 is to set up a 3D virtual robot model with 3D drawing software such as solidworks. The set of image tags means to render different articulated arms of a robot model in different colors. The monitoring perspective is an angle between the depth camera and the robot 3 to be monitored, and when the robot model moves within a preset range, there are a variety of monitoring perspectives. The real robot training dataset is to take depth images of the robot 3 with the RGB-D camera 1, conduct an image denoising, label different articulated arms with different colors in the denoised robot depth images with annotation software such as labelme, and get the real robot depth image dataset and the image tag dataset. Secondly, conduct robot articulated arm segmentation model training: sending the virtual training dataset and the real training dataset to an image segmentation using deep learning network model, such as FCNN, U-Net, DeepLab and Mask R-CNN for training; the image segmentation using deep learning network model will learn appearance and profile of the articulated arms as labeled according to pixel information marked in the image tag dataset and get deep learning network training configurations. Finally, record images at the working scenes of the robot 3 by installing a RGB-D camera in the robot 3 working site, and send images to the trained image segmentation model to make robot articulated arm segmentation, recognize different articulated arms of the robot 3 and label with different colors in the images of the working scenes. S2: recognizing human bone joints in the video information, such as by using images taken by a Kinect camera or other RGB-D camera 1, recognizes human joints and related parts (such as a joint at hand or head) by differentiate feature extraction-random forest algorithms and deep learning, segmenting and marking the human bone joints and calculating coordinate information of the human bone joints. S3: measuring distance between different human bone joints to different articulated arms, and judging whether the human bone joints contact the articulated arms, if so, judging which articulated arm of the robot 3 the human bone joints contact, and based on current running mode, sending a signal corresponding to the current running mode, the running modes comprise a teaching mode and a working mode, during the teaching mode, when a human hand joint contacts the articulated arms, sending a signal detection signal, and if not, sending a warning signal; during a working mode, when a human arm contacts the articulated arms, sending a collision and warning signal.

Please refer to FIG. 3, step S3 can be done in the following manner: converting information of all the positions and joints segmented by the robot articulated arm segmentation module 4-1 and the human arm segmentation module 4-2 to point cloud data with different position tags and conducting a collision check, sending different instructions to the surface electromyography signal detection module 4-4 or the robot communication and control module 4-5 based on different robot working modes. Specifically there are following steps S31: converting RGB-D images of the articulated arms segmented by the articulated arm segmentation module 4-1 and the human arm segmented by the human arm segmentation module 4-2 into point cloud; S32: marking position in point cloud of different articulated arms, marking position in 3D point cloud of different human joints and generating point cloud tags; S33: conducting a collision check between point cloud of each of the articulated arms and point cloud of each of the human joints, when a collision is detected between point cloud of different positions, go to step 34; S34: in a teaching mode, checking a point cloud tag of the human joint that collides with the articulated arm, and judging a contact position between the articulated arm and the human joint, in case a human hand collides with the articulated arm, sending a signal detection instruction to the surface electromyography detection module 4-4; otherwise, sending a warning signal; during working mode, sending a warning signal and sending a collision signal to the robot communication and control module 4-5 to control the robot 3 to stop running.

Step S4 and step S5 are as following: judging strength and direction of a force from the human arm after the human arm contacts the articulated arm according to received surface electromyography signals and inertial acceleration signals and sends the strength and direction of the force and species of the articulated arm contacted by the human arm to the robot communication and control module 4-5. Specifically, the computer 4 inputs the human surface electromyography signals and inertial acceleration signals into a neural learning network for training after feature extraction processing, and recognizes and analyzes surface electromyography signals with the trained neural network to identify magnitude and direction of the force. Specifically there are the following steps: Step 41: collect human surface electromyography signals and inertial acceleration signals and conduct a pretreatment, such as a Fourier transformation to transform collected time domain signals into frequency domain signals and performing a digital filter processing and extracting features. Step 42. Establish a human surface electromyography signal dataset and an inertial acceleration signal dataset. Collect surface electromyography signals and inertial acceleration signals of human motions according to force rendered when a teacher pushes an articulated arms of the robot and conduct a pretreatment to the signals as per step 41, establish datasets according to extracted features and mark corresponding labels and in the present invention, label human force rendering direction data in a human coordinate system. Step 43, send the established datasets to a deep learning network model for training, such as deep learning solutions CNN, RNN, Transfer learning. Step 44, identify magnitude and direction of forces on a real-time basis. Recognize magnitude and direction of forces from human surface electromyography signals with the trained deep learning model and data processed in step 41, and convert force direction from the human coordinate system to the robot coordinate system. Step 45, judge whether the force magnitude reaches the minimum threshold value, and determine whether the human arm contacts the articulated arms of the robot from whether the force magnitude reaches the threshold value, and send the magnitude, direction of the force and a type of the articulated arms of the robot to the robot communication and control module 4-5. In step S5, the robot communication and control module 4-5 receives information from the surface electromyography signal detection module 4-4, sends a signal controlling the contacted articulated arm to move against a robot base according to species of the articulated arm contacted by the human arm, controls movement direction of the contacted articulated arm according direction of the force, controls movement speed of the contacted articulated arm according to strength of the force, in the meantime, the robot communication and control module 4-5 saves movement parameters of the robot 3; when receiving a collision signal, the robot communication and control module 4-5 controls the robot 3 to stop immediately and restart after collision signal is dismissed. To be specific, step 51, setting a running mode for the robot 3, in the present invention there are two kinds of running modes, namely a teaching mode and a working mode. Step 52, during the teaching mode, receive magnitude and direction of force and the kind of articulated arm of the robot 3 to be contacted by a human hand and control movement of the articulated arm according to the kind of articulated arm of the robot 3, control movement direction of the articulated arm according to the direction of forces and control movement speed of the articulated arm according to the magnitude of force. Step 53, during the working mode, the robot communication and control module 4-5 controls the robot 3 to stop immediately when receiving a collision signal from the detection measurement module 4-3, and resume after the collision signal is lifted. Step 54, store movement parameters during robot teaching process.

In the present embodiment, an augmented reality verification module 4-6 is run in the computer 4, wherein the augmented reality verification module 4-6 comprises a virtual robot model, an augmented reality display module, and an AR card 5, which comprises the following steps: S61: setting up the virtual robot model with robot parameters, to have the augmented reality verification module 4-6 to load and recognize the virtual robot model and control its motion, establishing degree of freedom nodes for the virtual robot and setting up parent/child relationship, and building a virtual robot kinematic model based on motion parameters from a motion designing module; wherein, degree of freedom nodes are a coordinate system in the virtual robot model based on real robot articulated arm joints, so that the augmented reality verification module 4-6 can read and control different nodes of the virtual robot. Parent/child relationship is a relationship that a movement of the parent node will bring movement of the child node, which conforms with kinematic modes of the robot 3. S62: controlling the robot 3 to move, putting an end effector of the robot 3 sequentially in four corners of the AR card 5, and when the end effector arrives at a corner of the AR card 5, reading coordinates of the end effector by the robot 3, and getting coordinates of the AR card 5 corner in a robot coordinate system, and as coordinates of four corners of the AR card 5 in the AR card coordinate system are known, it is possible to reach a conversion relationship between the AR card coordinate system and the robot coordinate system, describing position of the virtual robot in the AR card coordinate system and converting to the robot coordinate system by the conversion relationship and superposing the virtual robot model to the robot 3; S63: after robot teaching completion, superposing the virtual robot model to a working scene of the robot 3, reading motion parameters recorded by the robot communication and control module 4-5 with the augmented reality display module, and moving the virtual robot model along a robot teaching route, to verify the robot teaching route in a virtual and reality mixing environment.

The robot teaching system based on image segmentation and surface electromyography provided by the present invention, makes image segmentation with a deep learning network, segments and recognizes articulated arms and human joints, judges contact condition between the human joints and the articulated arms, judges strength and direction of force from the human by the surface electromyography sensor 2 and controls each of the articulated arms to move and realize robot teaching. The robot teaching system according to the present invention is of simple structure, easy to deploy and not costly. In the meantime, the teaching method provided by the present invention is easy to operate, of which force control and response is quick, and it is possible to control the robot 3 to follow teaching gestures accurately.

The foregoing are merely several embodiments of the present invention and thus are not intended to limit scope of the present invention, all equivalent structural or process replacement taken advantage of information contained in the present description and the accompanying drawings, or use of the present invention directly or indirectly in other related technical fields are invariably covered in protection scope of the present invention.

The invention claimed is:

1. A robot teaching system based on image segmentation and surface electromyography signal (EMG) comprising:
    a RGB-D camera, a surface electromyography sensor, a robot and a computer,
    wherein the RGB-D camera, the surface electromyogram signal sensor and the robot are all in communication connection with the computer,
    wherein the RGB-D camera collects video information of robot teaching scenes and sends to the computer,
    wherein the surface electromyography sensor is worn on a forearm of a teaching person, wherein the surface electromyography sensor acquires surface electromyography signals and inertial acceleration signals of the teaching person, and sends to the computer,
    the computer is configured to:
    recognizes an articulated arm and a forearm of the teaching person,
    detects a contact position between the articulated arm and the forearm of the teaching person,
    calculates strength and direction of force rendered from a contact position by the surface EMG signals and the inertial acceleration signals after the forearm of the teaching person contacts the articulated arm, and
    sends a signal controlling contacted articulated arm to move according to the strength and direction of forces to realize robot teaching processing,
    wherein the computer further comprising: an articulated arm segmentation module, a human joint segmentation module and a distance measurement module,
    wherein the articulated arm segmentation module is configured to:
    conduct image segmentation to the video information by means of trained image segmentation network using deep learning,
    recognize different species of articulated arms and marks the different species of articulated arms with different colors in the video information,
    wherein the human joint segmentation module is configured to:
    recognize human bone joints in the video information,
    segment and mark the human bone joints and calculates coordinate information of the human bone joints,
    wherein the distance measurement module is configured to:
    measure distance between different human bone joints to different articulated arms, and
    judge whether the human bone joints contact the articulated arms,
    if yes, judges which articulated arm the human bone joints contact, and based on current running mode, sends a signal corresponding to the current running mode,
    wherein the running modes comprise a teaching mode and a working mode.

2. The robot teaching system based on image segmentation and surface electromyography signal according to claim 1, wherein the distance measurement module is further configured to:
    during the teaching mode, send a signal detection signal when the human bone joint contacts the articulated arms or send a warning signal when the human bone joint does not contact the articulated arms,
    during the working mode, sends a collision and warning signal when the human joint contacts the articulated arms.

3. The robot teaching system based on image segmentation and surface electromyography signal according to claim 2, wherein the computer further comprising: a surface electromyography signal detection module and a robot communication and control module, wherein:
    the surface electromyography signal detection module is configured to:
    judge strength and direction of force from the forearm of the teaching person after the forearm of the teaching person contacts the articulated arm according to received surface electromyography signals and inertial acceleration signals and
    send the strength and direction of force and species of the articulated arm contacted by the forearm of the teaching person to the robot communication and control module;
    the robot communication and control module is configured to:
    receive information from the surface electromyography signal detection module,
    send a signal controlling the contacted articulated arm to move against a robot base according to species of the articulated arm contacted by the forearm of the teaching person,
    control movement direction of the contacted articulated arm according direction of the force,
    controls movement speed of the contacted articulated arm according to strength of the force, in the meantime, and save robot movement parameters;
    the robot communication and control module is further configured to:
    controls the robot to stop immediately when receiving a collision signal, and
    restart after collision signal is lifted.

4. The robot teaching system based on image segmentation and surface electromyography signal according to claim 3, wherein the distance measurement module is further configured to operate the following steps:
    S31: converting RGB-D images of the articulated arms segmented by the articulated arm segmentation module and the human arm segmented by the human arm segmentation module into point cloud;

S32: marking position in point cloud of different articulated arms, marking position in 3D point cloud of different human joints and generating point cloud tags;

S33: conducting a collision check between point cloud of each of the articulated arms and point cloud of each of the human joints, when a collision is detected between point cloud of different positions, go to step 34;

S34: in a teaching mode, checking a point cloud tag of the human joint that collides with the articulated arm, and judging a contact position between the articulated arm and the human joint, in case a human hand collides with the articulated arm, sending a signal detection instruction to the surface electromyography detection module; otherwise, sending a warning signal; during working mode, sending a warning signal and sending a collision signal to the robot communication and control module to control the robot to stop running.

5. The robot teaching system based on image segmentation and surface electromyography according to claim 3, wherein the computer further comprising: an augmented reality verification module, wherein the augmented reality verification module comprises a virtual robot model, an augmented reality display module, and an augmented reality (AR) card, wherein the augmented reality verification module is configured to operate the following steps:

S61: setting up the virtual robot model with robot parameters, establishing degree of freedom nodes for a virtual robot and setting up parent/child relationship, and building a virtual robot kinematic model;

S62: controlling the robot to move, putting an end effector of the robot sequentially in four corners of the AR card, and when the end effector arrives at a corner of the AR card, reading coordinates of the end effector by the robot, and getting coordinates of the AR card corner in a robot coordinate system, and as coordinates of four corners of the AR card in the AR card coordinate system are known, it is possible to reach a conversion relationship between the AR card coordinate system and the robot coordinate system, describing position of the virtual robot in the AR card coordinate system and converting to the robot coordinate system by the conversion relationship and superposing the virtual robot model to the robot;

S63: after robot teaching completion, superposing the virtual robot model to a working scene of the robot, reading motion parameters recorded by the robot communication and control module with the augmented reality display module, and moving the virtual robot model along a robot teaching route, to verify the robot teaching route in a virtual and reality mixing environment.

6. A robot teaching method based on image segmentation and surface electromyography signal executed by a robot teaching system, wherein the robot teaching system comprises a RGB-D camera, a surface electromyography sensor, a robot and a computer; wherein the surface electromyography sensor is worn on a forearm of a robot teacher, and the robot teaching method executes following steps:

collects, by the RGB-D camera, video information of robot teaching scenes, sends, by the RGB-D camera, to the computer, collects, by the surface electromyography sensor, human surface electromyography signals and inertial acceleration signals and sends, by the surface electromyography sensor, to the computer, operates the following steps by the computer:

S1: recognizing articulated arms from the video information;

S2: recognizing a human arm from the video information;

S3: detecting a contact position between the human arm and the articulated arms;

S4: calculating strength and direction of force from the human arm after the human arm contacts the articulated arms with the surface electromyography signals and the inertial acceleration signal;

S5: sending a signal by the computer controlling the contacted articulated arm to move as per the strength and direction of force and realizing robot teaching, wherein specifically step S1 to step S3 further comprise:

S1: conducting image segmentation to the video information by means of trained image segmentation network using deep learning, recognizing different species of articulated arms and marking the different species of articulated arms with different colors in the video information;

S2: recognizing human bone joints in the video information, segmenting and marking the human bone joints and calculating coordinate information of the human bone joints;

S3: measuring distance between different human bone joints to different articulated arms, and judging whether the human bone joints contact the articulated arms, if so, judging which articulated arm the human bone joints contact, and based on current running mode, sending a signal corresponding to the current running mode, the running modes comprise a teaching mode and a working mode.

7. The robot teaching method based on image segmentation and surface electromyography signal according to claim 6, wherein specifically step S3 further comprise:

during the teaching mode, send a signal detection signal when the human arm contacts the articulated arms or send a warning signal when the human arm does not contact the articulated arms, during the working mode, sends a collision and warning signal when a human arm contacts the articulated arms.

8. The robot teaching method based on image segmentation and surface electromyography according to claim 7, wherein specifically step S4 and step S5 further comprise:

S4: upon receiving a signal detection instruction by the computer, judges, by the computer, strength and direction of force from the human arm after the human arm contacts the articulated arm according to received surface electromyography signals and inertial acceleration signals and sends, by the computer, the strength and direction of force and species of the articulated arm contacted by the human arm to the robot communication and control module;

S5: receives, by the robot communication and control module, information from the surface electromyography signal detection module, sends, by The robot communication and control module, a signal controlling the contacted articulated arm to move against a robot base according to species of the articulated arm contacted by the human arm, controls movement direction of the contacted articulated arm according to direction of the force, controls movement speed of the contacted articulated arm according to strength of the force, in the meantime, saves, by the robot communication and control module, robot movement parameters;
wherein specifically step S5 further comprise:
controls, by the robot communication and control module, the robot to stop immediately when receiving a collision signal and
restart, by the robot communication and control module, after collision signal is lifted.

9. The robot teaching method based on image segmentation and surface electromyography according to claim 8, wherein specifically step S3 further comprises:
S31: converting RGB-D images of the articulated arms segmented by the articulated arm segmentation module and the human arm segmented by the human arm segmentation module into point cloud;
S32: marking position in point cloud of different articulated arms, marking position in 3D point cloud of different human joints and generating point cloud tags;
S33: conducting a collision check between point cloud of each of the articulated arms and point cloud of each of the human joints, when a collision is detected between point cloud of different positions, go to step 34;
S34: in a teaching mode, checking a point cloud tag of the human joint that collides with the articulated arm, and judging a contact position between the articulated arm and the human joint, in case a human hand collides with the articulated arm, sending a signal detection instruction to the surface electromyography detection module; otherwise, sending a warning signal; during working mode, sending a warning signal and sending a collision signal to the robot communication and control module to control the robot to stop running.

10. The robot teaching method based on image segmentation and surface electromyography according to claim 8, wherein specifically step S6 further comprises:
S61: setting up a virtual robot model with robot parameters, establishing degree of freedom nodes for a virtual robot and setting up parent/child relationship, and building a virtual robot kinematic model;
S62: controlling the robot to move, putting an end effector of the robot sequentially in four corners of the AR card, and when the end effector arrives at a corner of the AR card, reading coordinates of the end effector by the robot, and getting coordinates of the AR card corner in a robot coordinate system, and as coordinates of four corners of the AR card in the AR card coordinate system are known, it is possible to reach a conversion relationship between the AR card coordinate system and the robot coordinate system, describing position of the virtual robot in the AR card coordinate system and converting to the robot coordinate system by the conversion relationship and superposing the virtual robot model to the robot;
S63: after robot teaching completion, superposing the virtual robot model to a working scene of the robot, reading motion parameters recorded by the robot communication and control module with the augmented reality display module, and moving the virtual robot model along a robot teaching route, to verify the robot teaching route in a virtual and reality mixing environment.

* * * * *